(12) United States Patent
Wang et al.

(10) Patent No.: US 11,533,333 B2
(45) Date of Patent: *Dec. 20, 2022

(54) MALWARE INFECTION PREDICTION (71) Applicant: BRITISH TELECOMMUNICATIONS PUBLIC LIMITED COMPANY, London (GB)

(72) Inventors: Xiao-Si Wang, London (GB); Zhan Cui, London (GB); Ian Herwono, London (GB)

(73) Assignee: BRITISH TELECOMMUNICATIONS PUBLIC LIMITED COMPANY, London (GB)

(*) Notice: Subject to any disclaimer, the term of this patent is extended or adjusted under 35 U.S.C. 154(b) by 90 days.

This patent is subject to a terminal disclaimer.

(21) Appl. No.: 15/733,663

(22) PCT Filed: Mar. 19, 2019

(86) PCT No.: PCT/EP2019/056887
§ 371 (c)(1),
(2) Date: Sep. 25, 2020

(87) PCT Pub. No.: WO2019/185404
PCT Pub. Date: Oct. 3, 2019

(65) Prior Publication Data
US 2021/0014240 A1 Jan. 14, 2021

(30) Foreign Application Priority Data
Mar. 25, 2018 (EP) .................... 18163823

(51) Int. Cl.
H04L 9/40 (2022.01)
(52) U.S. Cl.
CPC ........ *H04L 63/145* (2013.01); *H04L 63/1425* (2013.01); *H04L 63/1433* (2013.01)

(58) Field of Classification Search
CPC ............... H04L 63/145; H04L 63/1425; H04L 63/1433; H04L 63/1408
See application file for complete search history.

(56) References Cited

U.S. PATENT DOCUMENTS 8,904,542 B2  12/2014  Amnon et al.
9,679,140 B2   6/2017  Smith et al.
(Continued)

FOREIGN PATENT DOCUMENTS

CN    1841397 A   10/2006
CN  104166708 A   11/2014
(Continued)

OTHER PUBLICATIONS

Bose A., et al., "Propagation, Detection and Containment of Mobile Malware," 2008, 164 pages.
(Continued)

*Primary Examiner* — Ali S Abyaneh
(74) *Attorney, Agent, or Firm* — Patterson Thuente, P.A.

(57) ABSTRACT

A computer implemented method of protecting a target subnet, including a set of network connected devices in a hierarchy of subnets of a computer network, from malware attack. The method includes generating a dynamical system for each subnet in the network, each dynamical system modelling a rate of change of a number of network connected devices in the subnet that are: susceptible to infection by the malware; infected by the malware; protected against infection by the malware; and remediated of infection by the malware. The dynamical systems are based on rates of transmission of the malware between pairs of subnets; evaluating a measure of risk of infection of the target subnet at a predetermined point in time based on the dynamical system for the target subnet; and responsive to the measure
(Continued)

of risk meeting a predetermined threshold, deploying malware protection measures to devices in the target subnet.

6 Claims, 5 Drawing Sheets

(56) References Cited

U.S. PATENT DOCUMENTS

| | | | |
|---|---|---|---|
| 9,749,347 B2 | 8/2017 | Pinney Wood et al. | |
| 2003/0105973 A1 | 6/2003 | Liang et al. | |
| 2005/0050338 A1* | 3/2005 | Liang | H04L 63/108 713/188 |
| 2005/0248457 A1* | 11/2005 | Himberger | G06F 21/552 340/541 |
| 2008/0005124 A1 | 1/2008 | Jung et al. | |
| 2009/0133123 A1 | 5/2009 | Radha et al. | |
| 2019/0028496 A1* | 1/2019 | Fenoglio | H04L 63/1425 |
| 2021/0144168 A1* | 5/2021 | Vester | G06F 9/451 |

FOREIGN PATENT DOCUMENTS

| | | | |
|---|---|---|---|
| CN | 105359484 A | 2/2016 | |
| CN | 106027513 A | 10/2016 | |
| CN | 106599691 A | 4/2017 | |
| CN | 106656571 A | 5/2017 | |
| CN | 106936855 A | 7/2017 | |
| EP | 1835429 A2 * | 9/2007 | G06F 21/56 |
| EP | 1995929 A2 | 11/2008 | |
| EP | 1990973 B1 | 8/2015 | |
| KR | 101825911 B1 | 2/2018 | |
| RU | 91203 U1 | 1/2010 | |
| WO | WO-2008005376 A2 | 1/2008 | |

OTHER PUBLICATIONS

Extended European Search Report for Application No. EP18163821.4, dated Jul. 23, 2018, 9 pages.
Extended European Search Report for Application No. EP18163823.0, dated Jun. 26, 2018, 7 pages.
Feng L., et al., "Dynamical Analysis and Control Strategies on Malware Propagation Model," Applied Mathematical Modelling, Apr. 3, 2013, vol. 37, pp. 8225-8236.
GB Combined Search and Examination Report for GB Application No. GB1804776.1, dated Sep. 26, 2018, 6 pages.
Guo H., et al., "Impact of Network Structure on MalwarePropagation: A Growth Curve Perspective," Journal of Management Information Systems, 2016, vol. 33, No. 1, pp. 296-325.
International Search Report and Written Opinion for Application No. PCT/EP2019/056887 dated Apr. 12, 2019, 10 pages.
Rey A.M.D., "Mathematical Modeling of the Propagation of Malware: A Review," Security and Communication Networks, Jan. 28, 2015, vol. 8, pp. 2561-2579.
Combined Search and Examination Report for GB Application No. GB1804775.3, dated Sep. 28, 2018, 6 pages.
GB Combined Search and Examination Report for GB Application No. GB1804777.9, dated Sep. 26, 2018, 7 pages.
GB Combined Search and Examination Report for GB Application No. GB1903788.6, dated Sep. 20, 2019, 6 pages.
International Search Report and Written Opinion for Application No. PCT/EP2019/056888 dated Apr. 12, 2019, 10 pages.
Office Action and Search Report for Chinese Application No. 201980021010.4, dated Feb. 18, 2022, 11 pages.
Office Action for Chinese Application No. 201980021086.7, dated May 7, 2022, 4 pages.

* cited by examiner

MALWARE INFECTION PREDICTION

PRIORITY CLAIM

The present application is a National Phase entry of PCT Application No. PCT/EP2019/056887, filed Mar. 19, 2019, which claims priority from European Application No. 18163823.0, filed Mar. 25, 2018, each of which is hereby fully incorporated herein by reference.

TECHNICAL FIELD

The present disclosure relates to the detection of malware in computer systems. In particular, it relates to a prediction of occurrences of malware infection.

BACKGROUND

Malware detection technology is typically implemented on a per-system basis with communication between systems on the realization of a threat or attack. For example, organizations implement standard malware detection technology installed in or for each system, appliance or resource connected to an intranet. Such approaches suffer the disadvantage of reliance on speed of communication, speed of update of malware detection rules and speed of implementation of those rules to effectively respond to a malware attack.

SUMMARY

Accordingly, it would be beneficial to mitigate these disadvantages.

The present disclosure accordingly provides, in a first aspect, a computer implemented method of protecting a target subnet in a hierarchy of subnets of a computer network from malware attack, the subnet including a set of network connected devices, the method comprising: generating a dynamical system for each subnet in the network, each dynamical system modelling a rate of change of a number of network connected devices in the subnet that are: susceptible to infection by the malware; infected by the malware; protected against infection by the malware; and remediated of infection by the malware, the dynamical systems being based on rates of transmission of the malware between pairs of subnets; evaluating a measure of risk of infection of the target subnet at a predetermined point in time based on the dynamical system for the target subnet; and responsive to the measure of risk meeting a predetermined threshold, deploying malware protection measures to devices in the target subnet.

In some embodiments, the predetermined point in time is determined based on a time required to deploy the malware protection measures to all susceptible devices in the subnet.

In some embodiments, the protective measures include modifications to devices in the target subnet such that susceptible devices in the target subnet are rendered insusceptible to the malware.

In some embodiments, the protective measures include remediation measures to devices infected by the malware in the target subnet.

The present disclosure accordingly provides, in a third aspect, a computer program element comprising computer program code to, when loaded into a computer system and executed thereon, cause the computer to perform the method set out above.

BRIEF DESCRIPTION OF THE DRAWINGS

Embodiments of the present disclosure will now be described, by way of example only, with reference to the accompanying drawings, in which.

DETAILED DESCRIPTION

Embodiments of the present disclosure provide protection against malware attacks on a per-subnet basis in which a subnet is a subnetwork as a logical subdivision of an IP network as is well known in the art. Network connected devices are associated with a subnet in a computer network by a common identifier in a portion of their network address. In internet protocol (IP) version 4 addressing, a subnet is identified in a group of most significant bits of an IP address, the particular set of bits being characterized by a subnet mask as is known to those skilled in the art.

Subnets can be modeled organized hierarchically such that a network is organized divided into subnets that can themselves be further subdivided into further subnets. Thus, subnets can be represented by a tree structure of subnets, each node in the tree structure corresponding to a subnet, and each node having a parent node save for a root node for the tree.

Embodiments of the present disclosure take advantage of a model of relationships between subnets as a tree of subnets to predict the transmission and infection of devices in subnets by malicious software as malware. In particular, the transmission and cross-infection between subnets directly linked in the hierarchy of subnets is known to occur with a higher likelihood and at a higher rate than transmission and cross-infection between hierarchically distant subnets. Embodiments of the present disclosure employ a model of each subnet as a dynamical system to determine a rate of change of a number of network devices in a subnet that are: susceptible to infection by the malware; infected by the malware; protected against infection by the malware; and remediated of infection by the malware. Each dynamical system is a function describing the time dependence of each parameter, such as a differential equation as is known in the art.

Employing such dynamical systems it is possible to determine, for a point in time, a risk or likelihood of infection of devices in a particular subnet in the hierarchy. Furthermore, such risk information can be used to mitigate, prevent or alleviate the prospect of such infection by deployment of malware protection measures such as anti-malware services or remediations, rectifications and/or removal of vulnerabilities relied upon by the malware. Furthermore, such risk information can be used to identify subnets in a network being at lower risk of infection at a point in time and, therefore, subnets for which protective measures are to be prioritized of with which communication is to be prevented to provide a barrier to propagation of the malware.

Figure 1:
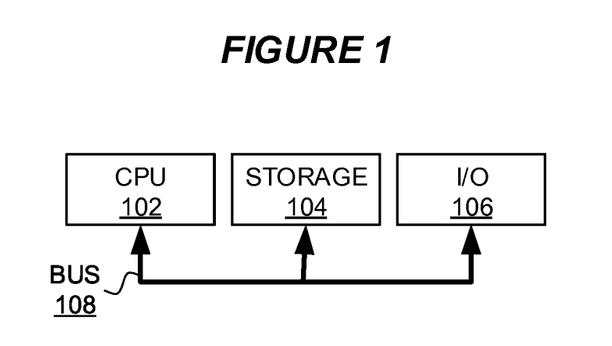
FIG. 1 is a block diagram a computer system suitable for the operation of embodiments of the present disclosure.

FIG. 1 is a block diagram of a computer system suitable for the operation of embodiments of the present disclosure. A central processor unit (CPU) 102 is communicatively connected to a storage 104 and an input/output (I/O) interface 106 via a data bus 108. The storage 104 can be any read/write storage device such as a random access memory (RAM) or a non-volatile storage device. An example of a non-volatile storage device includes a disk or tape storage device. The I/O interface 106 is an interface to devices for the input or output of data, or for both input and output of data. Examples of I/O devices connectable to I/O interface 106 include a keyboard, a mouse, a display (such as a monitor) and a network connection.

Figure 2:
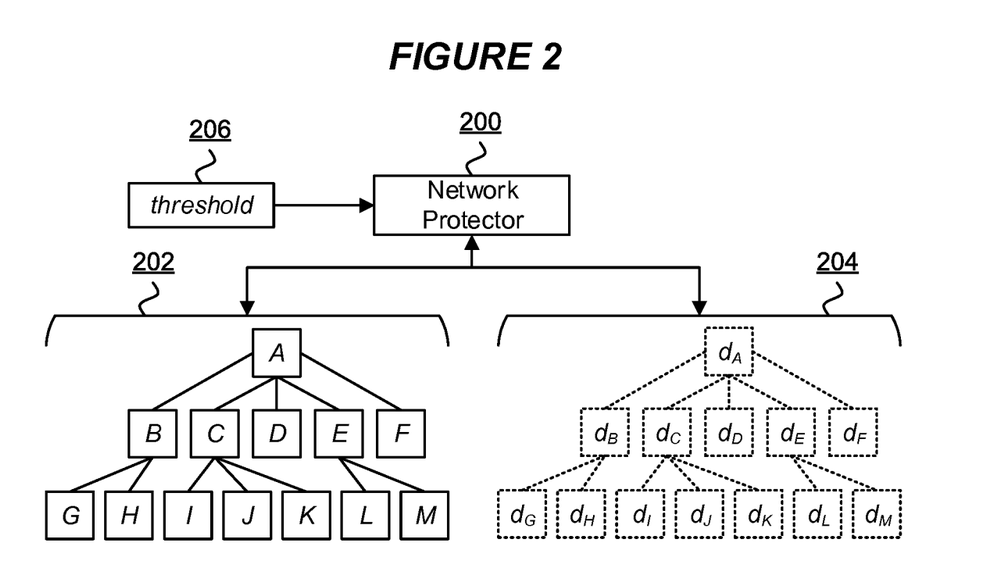
FIG. 2 is a component diagram of an arrangement for a network protector to protect a target subnet of a computer network in accordance with embodiments of the present disclosure.

FIG. 2 is a component diagram of an arrangement for a network protector 200 to protect a target subnet of a computer network 202 in accordance with embodiments of the present disclosure. The network protector 200 is a software, hardware, firmware or combination component for protecting a target subnet in the network 202. The network 202 is comprised of a plurality of subnets each having network connected devices and each being organized hierarchically and represented as a tree data structure having a node per subnet with each node having a parent save for the root node of the tree. Thus, subnets identified as A through M are provided. For example, in practice, subnet A could be represented by IP addresses starting 10.xxx.xxx.xxx with subnet B being represented by IP addresses starting 10.102.xxx.xxx and subnet C being represented by IP addresses starting 10.103.xxx.xxx. Such subnet addressing is familiar to those skilled in the art.

The network protector 200 generates a dynamical system for each subnet in the network 202 to provide a set of dynamical systems 204. Thus, the dynamical systems 204 illustrated in FIG. 2 with broken lines correspond each to the subnets in the network 202. Each dynamical system models a rate of change of a number of network connected devices in a subnet that are: susceptible to infection by the malware; infected by the malware; protected against infection by the malware; and remediated of infection by the malware, the dynamical systems being based on rates of transmission of the malware between pairs of subnets.

In embodiments of the present disclosure, network devices in each subnet are monitored and protected by anti-malware software. The anti-malware software provides for the detection of infected devices and therefore a number of infected devices can be determined at any specific point in time period. For each detected malware, a time series of infected devices can be modelled using dynamical systems covering all subnets. For each subnet, a dynamical system is built to model malware propagation. For n subnets, there are n interactive dynamical systems to model the propagation over the whole computer network 202. For an arbitrary subnet i, a dynamical system is built as a suite of differential equations for constituting the dynamical system for subnet i from the set of n subnets.

A dynamical system describes a system's change over a period of time and models changes of the status of network connected devices in the network 202. In one exemplary embodiment, devices can have one of four statuses: a status of "susceptible" meaning the device is not immune from infection by the malware; a status of "infected" or "infectious" meaning the device is currently infected by the malware and may be involved in, or a source of, propagation of the malware; a status of "protected" or "vaccinated" meaning the device has been remediated, patched or otherwise made immune to infection by the malware; and a status of "recovered" which means the device which has formerly been infected has been disinfected, cleaned or rebuilt and is no longer infected. Once one or several network connected devices are infected by a specific malware, the infection force pushes a proportion of the susceptible devices to be infectious; meanwhile vaccination force pushes a proportion of the susceptible devices to be immune to the infection; and recovery force pushes a proportion of infectious devices to be recovered from the infection.

Exemplary equations (1) to (5) for a dynamical system for a subnet i are provided below:

$$\frac{dS_i}{dt} = C_i - \sum_{j=1}^{n} R_{ji} \times I_j \times S_i - V_i \times S_i \quad (1)$$

$$\frac{dI_i}{dt} = C_i - \sum_{j=1}^{n} R_{ji} \times I_j \times S_i - Y_i \times I_i \quad (2)$$

$$\frac{dA_i}{dt} = V_i \times S_i \quad (3)$$

$$\frac{dB_i}{dt} = Y_i \times I_i \quad (4)$$

$$X_i = S_i + I_i + A_i + B_i \quad (5)$$

where: $C_i$ is a number of network connected devices in subnet i; $R_{ji}$ is a transmission rate of the malware between subnets i and j; $I_j$ is a number of devices in subnet j infected by malware; $S_i$ is a number of devices in subnet i susceptible to infection by the malware; $V_i$ is a rate at which devices in subnet i can be protected from the malware (i.e. a vaccination rate); $Y_i$ is a rate of recovery of infected devices in subnet i; $A_i$ is a number of vaccinated devices in subnet i; $B_i$ is a number of recovered devices in subnet i; and $X_i$ is a total number of network connected devices in subnet i. Thus: $dS_i/dt$ is a differential equation for the rate of change of a number of susceptible devices in subnet i over time; $dI_i/dt$ is a differential equation for the rate of change of a number of infected devices in subnet i over time; $dA_i/dt$ is a differential equation for the rate of change of a number of vaccinated devices in subnet i over time; and thus, $dB_i/dt$ is a differential equation for the rate of change of a number of recovered devices in subnet i over time.

Each dynamical system contains a mathematical term which models the malware transmission between devices within the same subnet and the malware transmission between devices from different subnets. The transmission rate among the devices within the same subnet and the transmission rate between devices from different subnets can be determined by a scale difference between them in terms of the hierarchy of subnets which reflects how likely a malware is to be transmitted from one device to another. The transmission rate among the devices within the same subnet can be set as a base transmission rate. The transmission rate between devices in different subnets can be defined to be proportional to the base transmission rate. The proportion can be determined by a kernel function which contains a scale difference between different subnets:

$$R_{ij} = \text{base transmission rate} \times \text{kernel function}$$

The Kernel function can be a scaling and bounding function which utilizes the hierarchical model of subnets to determine scale differences between network connected devices. Scale difference can be an integer which is calculated from model of the subnet hierarchy based on, for example, the branching in the hierarchy. For example, a scale difference between two devices in the same subnet can be defined to be 0 (e.g., devices with addresses 10.102.147.07 and 10.102.147.08, both in subnet 10.102.147.xxx). A transmission scale difference between two devices which are in the different subnets but share the first two parts of the IP address can be defined to be 1 (e.g., 10.102.147.07 and 10.102.196.08). A transmission scale difference of two devices which are in different subnets but share the first one part of the IP address can be defined to be 2 (e.g., 10.102.147.07 and 10.171.186.08). A transmission scale difference of devices which do not share even the top part of the IP address in the IP hierarchy can be defined to be 3 (e.g., 10.102.147.07 and 142.36.196.08).

kernel function=$f$ (scale difference between subnets)

The kernel function is a function in the exponential form to scale the transmission rate and make sure the transmission rate bounds between 0 and 1.

The within-subnet base transmission rates, the between-subnet transmission rates, the vaccination rate and the recovery rate are parameters for each dynamical system relating to a particular malware. Such parameters can be predetermined, predefined, estimated or learned from empirical data. For example, existing reported event data from anti-malware software can be divided into a training data set and a test data set. The training data can be used to estimate or learn these parameter values, such as by machine learning techniques. For example, the parameters can be estimated using machine learning methods such as regression, Bayesian inference and the Markov Chain Monte Carlo (MCMC). The estimates can then be built into the dynamical systems so as to build a model of the subnets and malware propagation through the subnets.

Once generated, the network protector 200 can evaluate a measure of a risk of infection of a particular target subnet in the network 200 at a particular point in time based on the dynamical systems 204 using the above equations. For example, the measure of risk can be a numerical value derived from on proportion of devices in the target subnet that are forecast to be susceptible or infected at the point in time by extrapolating current device information using the differential equations above. The network protector 200 further receives a threshold 206 as a predetermined threshold level of risk which, when the threshold is met, indicates a need for protective measures to be deployed to the target subnet. Such protective measures can include, for example, the installation of remediations for devices in the target subnet to vaccinate the devices against infection by the malware. Such protective measures can therefore include: modifications to devices in the target subnet; and/or remediation measures to devices infected by the malware in the target subnet.

In determining the risk of infection of the target subnet, a particular point in time must be used for which the risk is evaluated. The point in time can be selected based on a standard, predefined or estimated point in time in the future from a reference point in time. In some embodiments, the point in time is determined based on a prediction, estimate or determination of a time required to deploy malware protection measures to all susceptible and/or infected devices in the target subnet. That is, the point in time can be selected to be sufficiently far into the future that there is enough time to, if warranted, deploy responsive malware protection measures for the target subnet.

Figure 3:
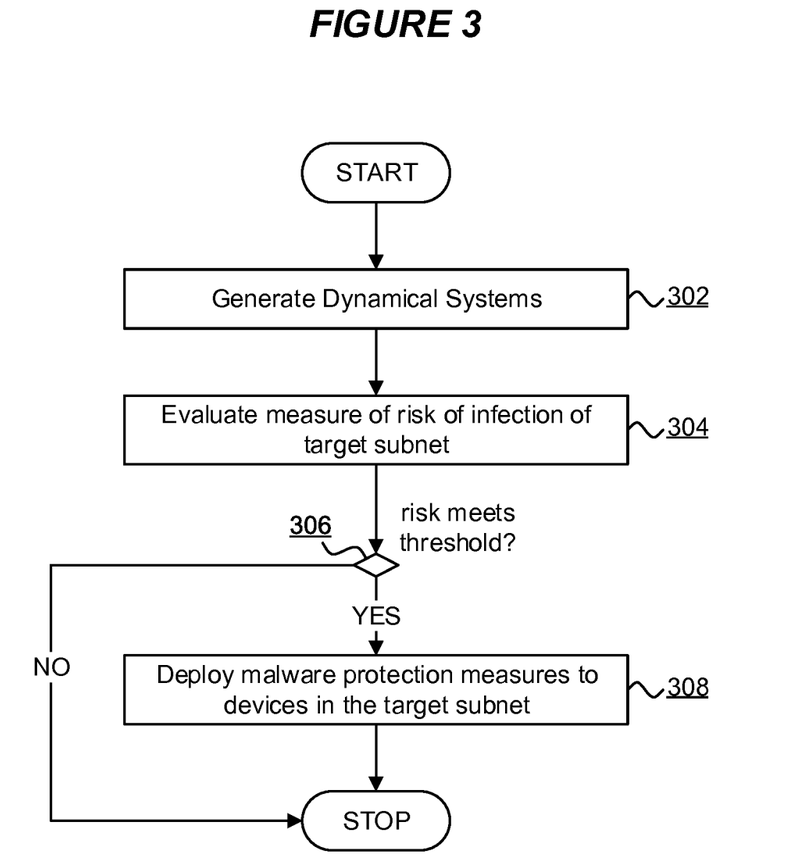
FIG. 3 is a flowchart of a method of protecting the target subnet in accordance with embodiments of the present disclosure.

FIG. 3 is a flowchart of a method of protecting the target subnet in accordance with embodiments of the present disclosure. Initially, at 302, the network protector 200 generates dynamical systems 204 for the subnets in the network 202. At 304 the method evaluates a measure of risk of infection of a target subnet at a particular point in time. At 306 the method determines if the risk of infection at the point in time meets the threshold risk 206 and, where the threshold is met, the method deploys malware protection measures to devices in the target subnet at 308.

Figure 4:
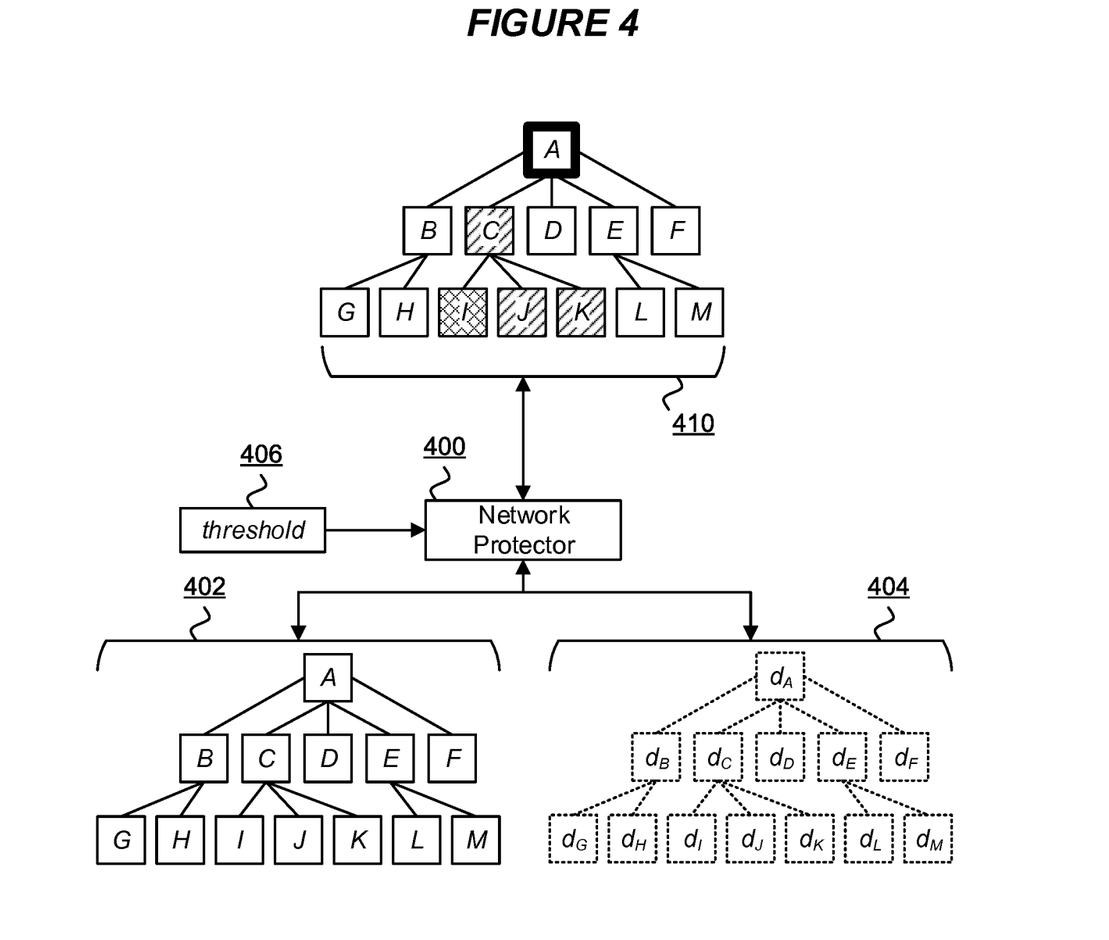
FIG. 4 is a component diagram of an arrangement for a network protector to protect a portion of a computer network in accordance with embodiments of the present disclosure.

Further embodiments of the present disclosure will now be described suitable for protecting a portion of a computer network. FIG. 4 is a component diagram of an arrangement for a network protector 400 to protect a portion of a computer network 402 in accordance with embodiments of the present invention. Many of the features of FIG. 4 are identical to those described above with respect to FIG. 2 and these will not be repeated here.

The network protector 400 of FIG. 4 differs from that described with respect to FIG. 2 in that the network protector 400 is arranged to protect a portion of the network 402 as a subset of subnets in the network 402, as opposed to a single target subnet. This is achieved by the network protector 400 evaluating a measure of risk of infection for each subnet in the network 402 for a predetermined point in time based on the dynamical systems 404. A model 410 of the subnets as, for example, a tree data structure, is then employed to record risk measures for each subnet. Preferably, the model 410 is a tree data structure comprising a node corresponding to each subnet and with each node having a parent save for a root node of the tree. Thus, the model 410 includes a risk measure for each subnet.

The network protector 400 identifies a first subset of nodes in the tree data structure for which the risk of infection by the malware at the predetermined point in is below the threshold risk 406. For example, as illustrated in FIG. 4, a node "I" in the model 410 is cross hatched to indicate that it is currently infected by malware, and nodes "C", "J" and "K" are diagonally hatched to indicate a measure of risk of infection at the predetermined point in time at or above the threshold measure 406. All other nodes are not shaded to indicate that a measure of risk of infection is below the threshold measure 406. Thus, the first subset determined by the network protector 400 includes all unshaded nodes in the model 410.

The network protector 400 further identifies a second subset of nodes as a subset of the first subset where the nodes in the second subset have connections in the model 410 to nodes having a risk of infection meeting or exceeding the threshold measure of risk 406. Notably, node "A" indicated by emphasized lines in the model 410 of FIG. 4 is so connected in the model 410 to node "C" having a measure of risk meeting or exceeding the threshold 406. Accordingly, node "A" constitutes the second subset of nodes.

Thus, in this way the network protector 400 determines, in the second subset, subnets in the network 402 having a risk of infection at the predetermined point in time below the threshold risk 406 but being in topologically proximate in the hierarchy of subnets to other subnets having a risk of infection at or above the threshold risk 406. Thus, the network protector 400 identifies, in the second subset, subnets that should be prioritized to defend the network against propagation of the malware by forming a border or boundary within the network 402 between subnets at which protective and/or defensive measures can be deployed to limit propagation of the malware in the network 402 by providing a barrier of subnets in the second subset. In some embodiments, protective actions are performed on all subnets identified in the first subset, though the network protector 400 prioritizes those subnets in the second subset so as to provide such a barrier.

In some embodiments, the predetermined point can is determined based on an estimate of a second point in time at which the protective actions in respect of devices in the subnets associated with each node in the second subset of nodes will be completed such that the protective actions can be implemented before the predetermined point of time. For example, the predetermined point in time can be compared with the estimated second point in time and, where the predetermined point in time is found to be before the second point in time, then a new predetermined point in time can be defined later than the second point in time and the processing of the network protector 400 can be repeated.

Figure 5:
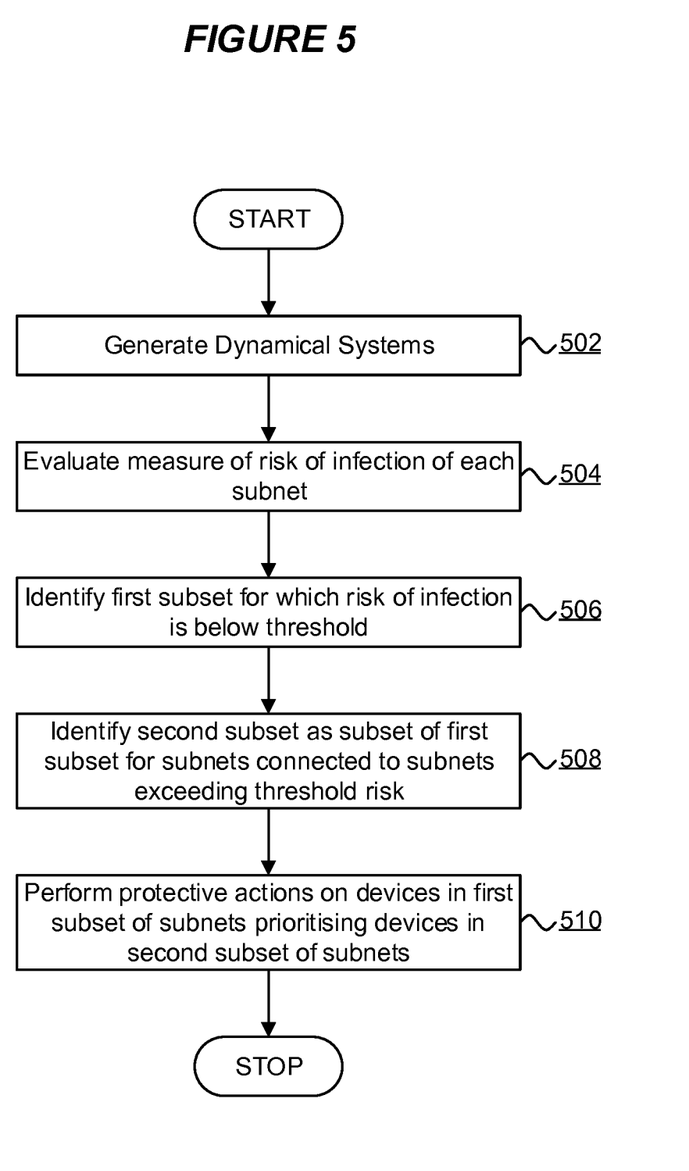
FIG. 5 is a flowchart of a method for protecting a portion of a computer network in accordance with embodiments of the present disclosure.

FIG. 5 is a flowchart of a method for protecting a portion of a computer network 402 in accordance with embodiments of the present disclosure. Initially, at 502, the method generates dynamical systems for the subnets as previously described. At 504 the method evaluates a measure of risk of infection at a predetermined point in time for each subnet in the network 402. At 506 the method identifies a first subset of subnets for which a risk of infection by the malware is determined to be below the threshold risk 406. At 508 the method identifies a second subset of subnets as a subset of the first subset including subnets associated with nodes in the model 410 that are connected with nodes associated with subnets determined to have a measure of risk that meets or exceeds the threshold level 306 at the predetermined point in time. At 510 the method performs protective actions on devices in the first subset of subnets prioritizing devices in the second subset of subnets.

Figure 6:
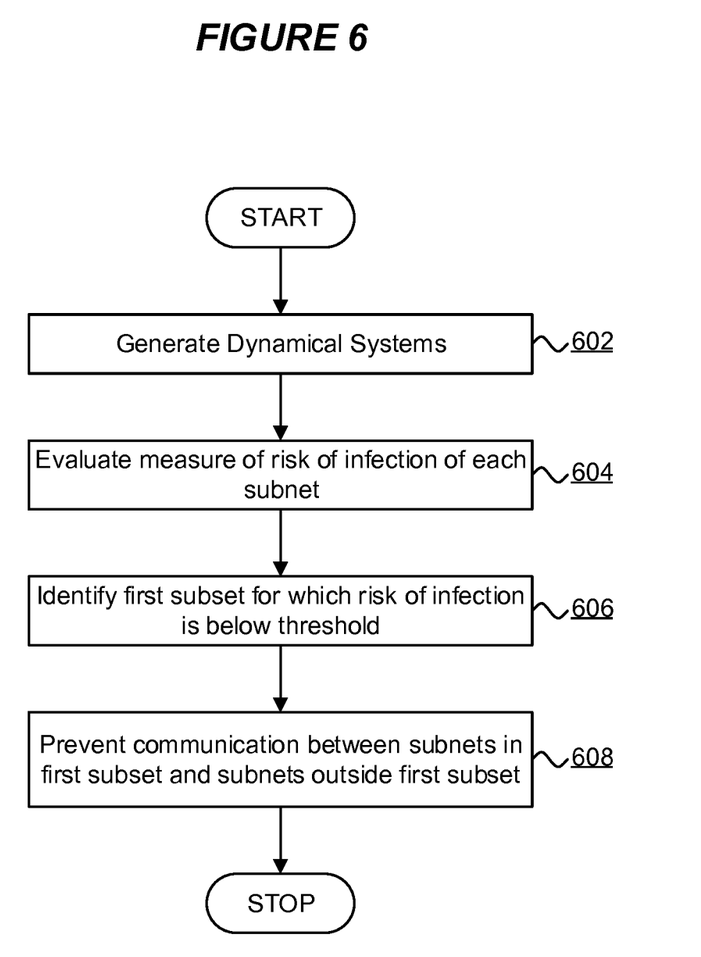
FIG. 6 is a flowchart of an alternative method for protecting a portion of a computer network in accordance with embodiments of the present disclosure.

FIG. 6 is a flowchart of an alternative method for protecting a portion of a computer network in accordance with embodiments of the present disclosure. According to the method of FIG. 6 an "air-gap", communication barrier or preclusion of communication is implemented between devices in subnets being having a risk of infection below the threshold 406 and subnets having a risk of infection above the threshold at the predetermined point in time. In this way, propagation of the malware can be reduced or prevented and a portion of the network being comprised of subnets with a risk of infection below the threshold 406 can be protected from communication with an infected (or likely infected) portion of the network. Thus, according to the method of FIG. 6, only a first subset of subnets is necessary for determination to identify those subnets for which communication should be prevented. Optionally, the second subset described above with respect to FIGS. 4 and 5 can additionally be determined in order to provide a barrier in the network 402 at the subnets in the second subset for which prevention of communication should be prioritized.

Prevention of communication between devices in different subnets can be achieved by, for example: forcing disconnection of communications connections between devices in the different subnets; preventing routing of network communications, packets or data between the different subnets; preventing forwarding or transfer or network communications between the different subnets; preventing network address translation, address resolution or address lookup for devices in a subnet to which communication is to be prevented; filtering network packets, data or units of communication to intercept, delete or prevent communication between the different subnets; intercepting communication between the different subnets; adapting routing rules to prevent communication between the different subnets including routing of network communications between the different subnets; and physical disconnection of network connections between the different subnets.

Initially, at 602, the method generates dynamical systems for the subnets as previously described. At 604 the method evaluates a measure of risk of infection at a predetermined point in time for each subnet in the network 402. At 606 the method identifies a first subset of subnets for which a risk of infection by the malware is determined to be below the threshold risk 406. At 608 the method implements prevention measures to prevent communication between subnets in the first subset and subnets outside the first subset.

Insofar as embodiments of the disclosure described are implementable, at least in part, using a software-controlled programmable processing device, such as a microprocessor, digital signal processor or other processing device, data processing apparatus or system, it will be appreciated that a computer program for configuring a programmable device, apparatus or system to implement the foregoing described methods is envisaged as an aspect of the present disclosure. The computer program may be embodied as source code or undergo compilation for implementation on a processing device, apparatus or system or may be embodied as object code, for example.

Suitably, the computer program is stored on a carrier medium in machine or device readable form, for example in solid-state memory, magnetic memory such as disk or tape, optically or magneto-optically readable memory such as compact disk or digital versatile disk etc., and the processing device utilizes the program or a part thereof to configure it for operation. The computer program may be supplied from a remote source embodied in a communications medium such as an electronic signal, radio frequency carrier wave or optical carrier wave. Such carrier media are also envisaged as aspects of the present disclosure.

It will be understood by those skilled in the art that, although the present disclosure has been described in relation to the above described example embodiments, the invention is not limited thereto and that there are many possible variations and modifications which fall within the scope of the invention.

The scope of the present disclosure includes any novel features or combination of features disclosed herein. The applicant hereby gives notice that new claims may be formulated to such features or combination of features during prosecution of this application or of any such further applications derived therefrom. In particular, with reference to the appended claims, features from dependent claims may be combined with those of the independent claims and features from respective independent claims may be combined in any appropriate manner and not merely in the specific combinations enumerated in the claims.

The invention claimed is:

1. A computer implemented method of protecting a target subnet in a hierarchy of subnets of a computer network from malware attack, the subnet including a set of network connected devices, the method comprising:

generating a dynamical system for each subnet in the computer network, each dynamical system modelling a rate of change of a subset of network connected devices in the subnet that are:
susceptible to infection by malware;
infected by the malware;
protected against infection by the malware; and remediated of infection by the malware;
wherein each dynamical system is based on rates of transmission of the malware between pairs of subnets and models a number of network connected devices in the subset over a period of time;
evaluating a measure of risk of infection of the target subnet at a predetermined point in time based on the dynamical system for the target subnet; and
responsive to the measure of risk meeting a predetermined threshold, deploying malware protection measures to devices in the target subnet.

2. The method of claim 1, wherein the predetermined point in time is determined based on a time required to deploy the malware protection measures to all susceptible devices in the subnet.

3. The method of claim 1, wherein the malware protection measures include modifications to devices in the target subnet such that susceptible devices in the target subnet are rendered insusceptible to the malware.

4. The method of claim 1, wherein the malware protection measures include remediation measures to devices infected by the malware in the target subnet.

5. A non-transitory computer-readable storage medium storing a computer program element comprising computer program code to, when loaded into a computer system and executed thereon, cause the computer system to perform the method as claimed in claim 1.

6. A computer system comprising:
a processor and memory storing computer program code for protecting a target subnet in a hierarchy of subnets of a computer network from malware attack, the subnet including a set of network connected devices, by:
generating a dynamical system for each subnet in the computer network, each dynamical system modelling a rate of change of a subset of network connected devices in the subnet that are:
susceptible to infection by malware;
infected by the malware;
protected against infection by the malware; and
remediated of infection by the malware;
wherein each dynamical system is based on rates of transmission of the malware between pairs of subnets and models a number of network connected devices in the subset over a period of time;
evaluating a measure of risk of infection of the target subnet at a predetermined point in time based on the dynamical system for the target subnet; and
responsive to the measure of risk meeting a predetermined threshold, deploying malware protection measures to devices in the target subnet.

* * * * *

UNITED STATES PATENT AND TRADEMARK OFFICE
CERTIFICATE OF CORRECTION

PATENT NO. : 11,533,333 B2
APPLICATION NO. : 15/733663
DATED : December 20, 2022
INVENTOR(S) : Xiao-Si Wang It is certified that error appears in the above-identified patent and that said Letters Patent is hereby corrected as shown below:

On the Title Page

On page 2, in Column 2, item (56), under OTHER PUBLICATIONS, Lines 10-11, delete "MalwarePropagation:" and insert -- Malware Propagation: --, therefor.

In the Drawings

Sheet 4 of 5, FIG. 5, in step "510", Line 2, delete "prioritising" and insert -- prioritizing --, therefor.

In the Specification

In Column 2, Line 6, delete "diagram a" and insert -- diagram of a --, therefor.

In Column 3, Line 54, delete "modelled" and insert -- modeled --, therefor.

In Column 4, Line 33, delete "$C_1$" and insert -- $C_i$ --, therefor.

In Column 6, Line 19, delete "invention." and insert -- disclosure. --, therefor.

In Column 8, Line 31, delete "Preferably," and insert -- In some embodiments, --, therefor.

In Column 8, Line 42, delete "invention" and insert -- disclosure --, therefor.

In Column 8, Line 44, delete "invention." and insert -- disclosure. --, therefor.

Signed and Sealed this
Eleventh Day of April, 2023

Katherine Kelly Vidal
*Director of the United States Patent and Trademark Office*